Jan. 15, 1963  J. N. FRIEDMAN  3,073,489
AEROSOL METERING VALVE ASSEMBLY
Filed June 6, 1960  2 Sheets-Sheet 1

INVENTOR
JACK N. FRIEDMAN
BY *Samuel L. Davidson*
ATTORNEY

Jan. 15, 1963 J. N. FRIEDMAN 3,073,489
AEROSOL METERING VALVE ASSEMBLY
Filed June 6, 1960 2 Sheets-Sheet 2

INVENTOR
JACK N. FRIEDMAN
BY *Samuel L. Davidson*
ATTORNEY

United States Patent Office 3,073,489
Patented Jan. 15, 1963

3,073,489
AEROSOL METERING VALVE ASSEMBLY
Jack N. Friedman, 545 Greenleaf, Glencoe, Ill.
Filed June 6, 1960, Ser. No. 34,120
8 Claims. (Cl. 222—394)

This invention relates to aerosol containers, and particularly to valve assemblies used with such containers for dispensing measured qantities of contents.

The idea of, and principles involved, in dispensing liquids or active ingredients by utilizing a suitable aerosol-forming liquid or "liquified gas" are well known. Generally, active ingredients and aerosol-forming liquids are placed within a container, and the aerosol-forming liquids cause a pressure to be built up within the container. Some type of valve assembly, usually including a depressible valve stem, is carried by the container so that the user merely has to depress the valve stem in order to obtain the contents of the container in spray form. Because of the versatility of such aerosol units, they have received wide acceptance by the public.

In fact, various forms of aerosol containers and associated dispensing mechanisms have even been developed for use where it is desired to dispense a measured quantity of the contents of the container. The dispensing devices which dispense a measured quantity of the contents are normally referred to as "aerosol metering valve assemblies," and the present invention is particularly concerned with an improved type of such assembly.

Aerosol metering valve assemblies, like other types of metering valves, incorporate a metering chamber separate from but communicating with the interior of the container whose contents are to be dispensed. However, because of the fact that metering assemblies used with aerosol containers are subjected to pressurized contents, because of the fact that aerosol containers are used often with very active ingredients, and because of the fact that aerosol containers are generally thrown away after the contents thereof have once been used, the considerations which enter into the design of an "aerosol metering valve assembly" differ substantially from the considerations which enter into the design of a metering valve assembly of the type used with a refillable housing carrying non-pressurized contents. More specifically, the following features are particularly important in aerosol metering valve assemblies: (1) the metering valve assembly should be such that the interior of the container is shut off from communication with the metering chamber positively when the contents are being dispensed from the metering chamber; (2) the component parts of the metering assembly should be such that they do not deteriorate or swell when subjected to the contents, or if they deteriorate or swell, such factor should not interfere with operation of the valve assembly; (3) the assembly must be capable of being inexpensively manufactured by mass production techniques so that it can be discarded with the container; (4) the assembly preferably is so designed that the step of initially charging the container with the active ingredients as well as the "liquified gas" can be carried out by passing the charge through the metering chamber; and (5) the assembly should be so designed that no leakage through the metering chamber is encountered once the container has been charged with contents.

While prior art assemblies have been developed which possibly conform with some of the conditions set forth in the preceding paragraph, there exists no simple and inexpensive aerosol metering valve assembly which meets all of the conditions. Accordingly, an object of the present invention is to provide an aerosol metering valve assembly (a) which is inexpensively manufactured by existing, known mass production techniques; (b) which incorporates components whose characteristics when subjected to the contents of the container do not interfere with operation of the metering valve assembly; (c) which can be utilized in connection with an aerosol container whereby the container can be charged via the metering chamber; (d) which provides for positive shut-off of the interior of the container from the metering chamber during the time that the contents are being dispensed from the metering chamber; and (e) which is so constructed that there is no leakage through the valve assembly.

Another object of the present invention is to provide an aerosol metering valve assembly conforming with the preceding object and incorporating a valve means to close off communication between the interior of the aerosol container and the metering chamber, which valve means initially closes off such communication upon operation of the valve assembly by means of a depressible valve stem, but more tightly closes off such communication when contents are being dispensed from the metering chamber.

A still further object of the present invention is to provide an aerosol metering valve assembly (1) which is not dependent upon the pressure of the contents for operation of any of the valve components forming a part thereof; (2) which valve assembly does not require a sealing gasket at opposite ends of the metering chamber for proper operation; (3) which valve assembly is easily operable by depression of a cap suitably attached to a reciprocable valve stem; (4) which valve assembly is not subject to becoming inoperative because of non-positive movement of the component parts thereof; and (5) which valve assembly can be adapted for use with virtually any type of aerosol container.

Still a further and more specific object of the present invention is to provide an aerosol metering valve assembly which includes at least two separate biasing means, preferably in the form of springs, that are responsible for causing the tighter closing-off of communication between the metering chamber and the interior of the container in accordance with preceding objects when the contents are being dispensed from the chamber, and which, in addition, provide for automatic restoring of the assembly components to their initial position in a predetermined sequence that definitely ensures against dispensing more than the measured quantity during any given operation of the assembly.

The invention consists in the construction, arrangements, and combination of the various parts of the assembly, whereby the objects contemplated are attained as hereinafter more fully set forth and specifically pointed out in the annexed claims. A better understanding of the invention will be achieved, and objects other than those specifically set forth above will become apparent, when consideration is given to the following detailed description of the illustrative embodiments of the invention presented in the annexed drawings, wherein:

Figure 4:
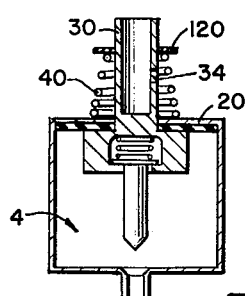
Figure 5:
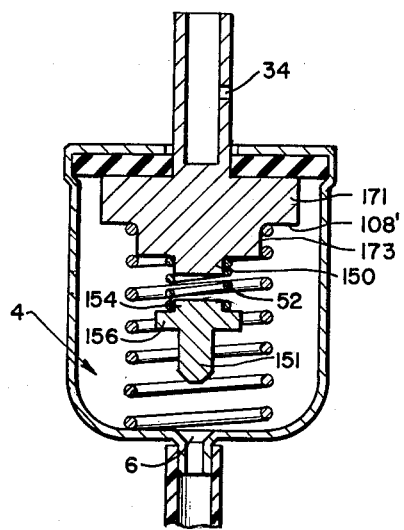
Figure 6:
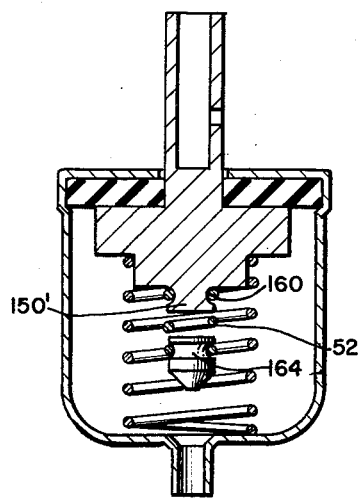

FIGURE 4 presents still a further modified form of the improved metering valve assembly provided by the invention and shows particularly a form wherein one of the biasing means or springs is carried outside of the metering chamber;

FIGURE 5 presents still another modified form of improved metering valve assembly provided by the invention, and incorporating a non-recessed valve stem base plunger; and FIGURE 6 presents a further modified form of metering valve assembly provided by the invention, the form of assembly shown in FIGURE 6 being of a type similar to that shown in FIGURE 5.

Figure 1:
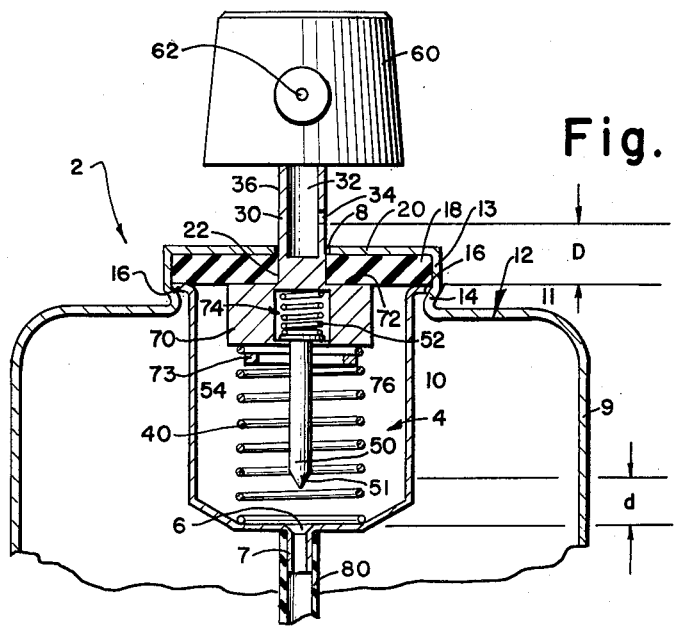
FIGURE 1 is a cross-sectional view of an improved aerosol metering valve assembly constructed in accordance with the present invention and attached to an aerosol container.

In the drawings, the numeral 2 has been used to generally designate the overall metering valve assembly provided by the invention, and this assembly, as shown in FIGURE 1, includes a metering chamber 4 having an inlet orifice 6 and an aperture 8 extending through a wall of the chamber opposite the inlet orifice. More specifically, the chamber is formed by a generally cylindrical open end housing 10 which cooperates with the walls of the aerosol container 12.

The exemplary aerosol container 12 shown in FIGURE 1 has a cylindrical body portion 9 terminating in an annular top wall 11. An integral upstanding neck 13 projects upwardly centrally of the annular top wall and terminates in an inturned flange or cap portion 20 having a central opening 8 therein. The neck 13 is crimped as at 14, and the laterally-projecting flange 16 carried at the top of housing 10 overlies the crimp 14 and underlies a gasket 18 disposed between the flange 16 and the inturned flange or cap portion 20 of the container. Preferably, as shown, the gasket 18 extends entirely under the cap portion 20 and forms an effective seal between the housing 10 and the walls of the container 12.

Notwithstanding the presentation of a particular form of container in FIGURE 1 as described above, it should be understood that the invention can be practised with aerosol containers having neck portions constructed in various ways without departing from the scope and spirit of the invention. For example, the metering chamber 4 and gasket 18 may cooperate with a detachable closure for an open end or open neck of an aerosol container, as opposed to cooperating with an integral neck portion as shown. The important factor is that the chamber is effectively sealed from communication with the interior of the container except via an inlet port. Usually, a dip-tube which extends within the container is coupled with the inlet port, and thus contents of the container are delivered to that port via the dip-tube and under the action of the pressure existent within the container.

Regardless of the container structure and manner in which the chamber housing 10 cooperates therewith, according to the invention, the valve assembly includes a depressible valve stem operable to cause dispensing of a measured quantity of container contents. In the FIGURE 1 embodiment, the valve stem is designated by numeral 30, and by reference to that figure, it will be seen that valve stem 30 is reciprocable in the central opening or aperture 8 in the shoulder 20 as well as within an aperture 22 provided in the gasket 18. As shown, the aperture 22 is coaxial with the aperture 8 and both of these apertures, as well as the valve stem 30, are coaxial with the inlet orifice 6 of the metering chamber. Moreover, the valve stem 30 is provided with a longitudinal passageway 32 therein and at least one cross-aperture or port 34 which communicates the passageway 32 with the outside or exterior surface 36 of the stem. A first biasing means in the form of a spring 40 normally urges the valve stem 30 to a position where the cross-aperture 34 is outside of the metering chamber 4 and spaced from the inside of the metering chamber 4 by a predetermined minimum distance which is indicated by D in FIGURE 1.

Although the aperture or port 34 is normally maintained outside of the metering chamber 4, upon depression of valve stem 30 by applying pressure to cap 60, the port 34 is moved into the chamber to communicate the passageway 32 in the stem with the chamber 4. In order to prevent the contents of the container from continuously passing into the chamber through inlet port 6 and then out of the chamber via the valve stem passageway 32 when the stem is depressed, the aerosol metering valve assembly also incorporates a plunger means 50 adapted to close the inlet orifice 6 at the appropriate time and in a particular manner. The valve plunger means 50 is positively coupled with the valve stem 30 for movement therewith. As shown in FIGURE 1, and as explained in detail hereinbelow, the valve plunger 50 according to the preferred embodiment of the invention, has a head portion 54 reciprocably movable within a socket recess 74 provided in a valve stem base plunger 70. Additionally, a second biasing means in the form of a spring 52 disposed in the socket recess acts on head portion 54 of valve plunger 50 to normally urge the valve plunger 50 toward the inlet port 6.

By virtue of the cooperation between the valve stem 30 and plunger 50, when the cross-aperture 34 is in the position shown in FIGURE 1 outside of the chamber, the plunger means 50 is disposed out of closing relationship with the inlet orifice, but when the valve stem is depressed, the plunger means 50 is moved to close the inlet orifice through a given distance designated in FIGURE 1 by $d$. The distance $d$ through which the plunger is movable to close the inlet orifice is less than the distance $D$ through which the valve stem must be moved to bring port 34 into chamber 4. Thus, in operation, when the valve stem 30 is depressed, the first biasing means or spring 40 is compressed, and as a result the plunger 50 moves into closing engagement with the inlet orifice 6. After the plunger 50 has moved into closing engagement with the inlet orifice 6, but before the cross-aperture 34 communicates passageway 32 with the interior of the chamber 34, the second biasing means or spring 52 is compressed. In other words, the inlet orifice 6 is closed as the stem 30 is depressed, and then the plunger means 50 is more tightly seated as the cross-aperture 34 passes into communication with the metering chamber 4.

After the valve stem 30 has been depressed so that cross-aperture or port 34 is at least partially within the metering chamber 4, the contents within the chamber pass through the cross-aperture or port 34, through the longitudinal passageway 32, and into the cap 60, and then out through an exit orifice 62 in the cap. The construction of the cap can take any well-known form, and is merely shown for illustrative purposes in FIGURE 1. It should be understood that the chamber 4 fills when the assembly components are in the position shown in FIGURE 1, and the chamber is emptied when the stem 30 has been depressed so that the cross-aperture 34 communicates the interior of chamber 4 with the passageway 32 and thus the exit orifice 62.

After the metering chamber 4 has been emptied as described, then the operator need merely release the stem, and the parts automatically return to their normal position. During this operation, springs 40 and 52 expand, and in so doing the stem is caused to move back to its initial position where the cross-aperture 34 is outside of the housing, and the plunger 50 is moved back to its initial position free of closing engagement with the inlet orifice 6.

By providing a reciprocable valve stem, a valve plunger positively movable therewith, and separate biasing means or springs in an aerosol metering valve assembly which operates in the manner explained above, a sequence of component movements is obtained which ensures against dispensing more than a predetermined measured quantity during any given operation of the assembly. More specifically, in accordance with the invention, two operations take place prior to the time that the outlet passageway 32 in the valve stem communicates with the metering chamber 4, namely, (1) the valve plunger 50 is moved to a position to initially close off communication between the measured metering chamber 4 and the interior of the container 12, and (2) then the valve plunger 50 is more tightly seated to close off such communication under the action of spring 52. Thus, whenever the cross-aperture or port 34 in the valve stem is in close proximity to the interior of the metering chamber 4, the inlet port 6 to such metering chamber is positively shut by a valve plunger. The provision of the second biasing means or spring 52 not only allows for some adjustability in position of the valve plunger 50 when moved to close the inlet port 6, and thus proper seating, but in addition allows for spacing the cross-aperture or port 34 upward on the valve stem 30 so that the inlet orifice 6 must be definitely closed prior to the time that the cross-aperture or port 34 is even partially in communicating relationship with the chamber 4.

Similarly, once the assembly has been operated so as to dispense contents from the metering chamber 4, communication between the interior of the container 12 and the metering chamber 4 is not established until after the cross-aperture or port 34 has moved to a position out of communication with the interior of the metering chamber. In other words, the second biasing means or spring 52 ensures against communication between the interior of container 12 and the interior of the metering chamber 4 during the time that the cross-aperture or port 34 is either moving into communication with the interior of the metering chamber or out of communication with the interior of the metering chamber. Accordingly, during any given operation of the aerosol metering valve assembly provided by the invention only a predetermined quantity of container contents can be released.

Having thus described in some detail the operating characteristics of the improved aerosol metering valve assembly provided by the invention, attention can now be directed to detailed structural considerations.

In the embodiment shown in FIGURE 1, the inlet orifice 6 is the terminal end of a cylindrical coupling 7 which frictionally engages a dip-tube 80 extending down into the aerosol container in the usual manner. As will become apparent hereinbelow, the form of this connection may vary without departing from the scope and spirit of the invention.

As explained generally above, the preferred embodiment of the invention incorporates a valve stem base plunger. Preferably, the valve stem 30 is formed integral with the valve stem base plunger 70 and projects upwardly therefrom through the apertures 22 and 8. Moreover, the stem 30 is provided with a continuously cylindrical peripheral portion which makes a sliding and sealing fit in at least the aperture 22 of the gasket 18 whereby there is an effective seal between the valve stem and the gasket. Although the seal between stem 30 and gasket 18 is adequate, to ensure positive sealing when the container is not in use, the upper surface 72 of the valve stem base plunger 70 seats on the gasket 18 around the aperture 22 therein.

The stem base plunger 70, as also generally explained above, is provided with a socket recess 74, which as shown in FIGURE 1 is partially closed by a flange 76. The head portion 54 of auxiliary plunger 50 is reciprocably movable within the socket recess 74 into and out of engagement with the flange 76. The second biasing means, which can be any compressible media, but preferably takes the form of a spring 52, normally urges the head portion 54 into engagement with the flange 76. However, when the valve stem 30 is depressed so that the tip 51 of the shaft portion of auxiliary plunger 50 seats in the inlet orifice 6, the spring 52 is compressed and the head portion 54 of the plunger 50 moves out of engagement with the flange 76.

The embodiment shown in FIGURE 1 is readily adapted to mass production techniques since the plunger 50 and the spring 52 can be inserted into a socket recess 74 of the main stem 30 prior to the main assembly of the stem 30, spring 40, housing 10, gasket 72 and cap 20, and prior to placing of the entire valve assembly into the container.

Although no specific explanation has been given hereinabove as to the disposition of the main biasing means or spring 40, it should be apparent from FIGURE 1 that such spring is disposed between the underside of the valve stem base plunger 70 and the bottom wall of the metering chamber 4, and extends in surrounding relation to the plunger 50. Preferably, lugs such as those designated by numeral 73 project from the underside of the valve stem base plunger 70 and cooperate with the top coils of the spring 40 to maintain the spring in proper alignment with other components of the assembly.

While the embodiment of the invention presented in FIGURE 1, and described in detail hereinabove, presents the basic structure and operation of a valve assembly constructed in accordance with the preferred embodiment of the invention, certain modifications can be made thereto with advantage, as explained in the following paragraphs.

Figure 2:
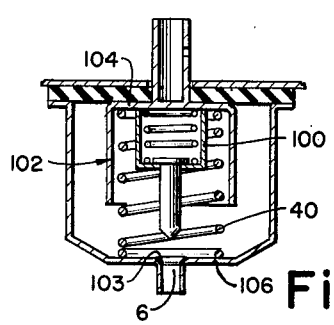
FIGURE 2 is a cross-sectional view of a modified form of the aerosol metering valve assembly shown in FIGURE 1, FIGURE 2 incorporating a different type of valve stem base plunger.

The construction shown in FIGURE 2 is quite similar to the construction shown in FIGURE 1, however, the socket recess 74 is replaced by a double cup arrangement including an inner cup 100 disposed within an outer cup 102. The main biasing means or spring 40 extends within the outer cup 102 and bears against the upper wall 104 thereof and the lower wall 106 of the chamber 4. This arrangement provides for more complete support of spring 40, and may present certain fabrication advantages. The operating characteristics of the FIGURE 2 embodiment, however, are essentially the same as the operating characteristics of the embodiment of the invention shown in FIGURE 1, and thus a repetition of the details of operation is not necessary. Another modification shown in FIGURE 2 concerns the provision of an O-ring such as that designated by 103 at the inlet orifice. This O-ring will cooperate with the plunger 50, which can be metal or plastic, to provide a tighter seal. However, it should be understood that a plastic-to-plastic seal or metal-to-plasitc seal can be used without departing from the scope and spirit of the invention.

The FIGURE 3 embodiment, while again similar to the FIGURE 1 embodiment, possesses certain advantages thereover in connection with filling of a container with which the invention is used. If reference is made to FIGURE 3, it will be noted that the valve stem 30 is not formed as an integral part of the main plunger 70' but instead is releasably coupled therewith. The valve stem base plunger is provided with a stem-receiving socket 112 having at the base thereof a cylindrical recess 114. The terminal end 31 of the valve stem fits within the socket 112 and cooperates with the recess 114 whereby the stem is releasably frictionally secured to the valve stem base plunger 70'. With this construction, the valve stem can be removed, and the aerosol container can be charged with contents via the metering chamber 4. This is accomplished by exerting a predetermined pressure when the stem is not in place upon the plunger 70' to dislodge its upper surface from seating engagement with the gasket 18, which predetermined pressure is not sufficient to cause the auxiliary plunger 50 to move into seating engagement with the inlet orifice 6'. To phrase this another way, the container is charged by depressing the plunger 70' by a distance less than $d$, whereby there is communication between the aperture in the gasket 18 and the interior of container 12 through the metering chamber 4, the inlet orifice 6', and the dip-tube 80. The need for charging the containers under refrigeration and capping the containers in the well-known manner is eliminated.

In the reverse operation, namely, in discharging of the contents, the assembly requires, as indicated above, the use of stem 30 and its cross-hole 34 so that the metering action of plunger 50 is brought into operation.

Figure 3:
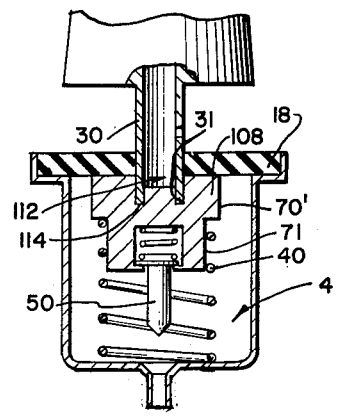
FIGURE 3 is a cross-sectional view of still another modified form of the improved metering valve assembly provided by the invention, FIGURE 3 showing an assembly wherein the valve stem is releasably coupled with other components of the assembly.

Notwithstanding the fact that the provision of a detachable valve stem is the most significant and important difference between the embodiments of FIGURES 1 and 3, it should be pointed out that in the FIGURE 3 embodiment, a stepped valve stem base plunger is used, and the lower step 71 thereof serves to support the spring 40 in proper position.

The construction shown in FIGURE 4 again is similar to that shown in FIGURE 1. The difference between the structures, however, is that the main biasing means or spring 40 is not disposed within the metering chamber 4. Instead, the valve stem 30 carries a lateral projection 120 spaced from the neck or cap portion 20 of the container. The spring 40 is disposed between the cap portion 20 and the lateral projection 120, and operation of the FIGURES 1 and 4 embodiments is the same. Upon depression of the valve stem 30, the spring 40 is compressed, and upon release of the valve stem 30, it is urged back to its original position. The lateral projection 120 preferably takes the form of a spring disc which can be easily snapped onto the stem 30 in a manner well known to those in the art.

Still another modified form of metering valve arrangement provided by the present invention which operates upon the same principles as the assembly shown in FIGURE 1, is presented in FIGURES 5 and 6. In the FIGURE 5 embodiment, the valve stem base plunger 171 is not provided with any recess but is stepped in a similar manner to the main plunger means 70' shown in FIGURE 3. The main biasing means 40 bears against the stepped surface 108' and is supported by the lower step 173. In addition, the main plunger means is provided with a projection 150, and with this projection, the second spring 52 frictionally cooperates. The auxiliary plunger means 151 of FIGURE 5 also carries a projection, namely 154, which also frictionally engages the spring 52. Thus, the auxiliary plunger means 151 is positively connected with the valve stem base plunger 171 by means of the spring 52. Moreover, the plunger means 151 of FIGURE 5 carries a laterally-projecting flange 156 against which the lower end of the spring 52 bears. In operation, the auxiliary plunger means 151 is seated prior to the time that the cross-aperture 34 in the valve stem communicates with the interior of the chamber 4 and slippage of the plunger within the spring is prevented by flange 156.

The operation of the FIGURE 5 embodiment is essentially the same as in the FIGURE 1 embodiment, although the main plunger means is not provided with a recess.

The FIGURE 6 embodiment is a modified form of the arrangement shown in FIGURE 5. As opposed to merely frictionally engaging the spring 52, the valve stem base plunger and the auxiliary plunger are positively coupled therewith. More particularly, the valve stem base plunger is provided with a recess 160 on the step 150' and the auxiliary plunger means 164 is bullet-shaped, and provided with a circumferential recess 164. The top and bottom coil of the spring 52 engage such recesses.

In all of the embodiments of the invention presented in the drawings, and considered hereinabove, a main or first biasing means in the form of a spring 40 has been incorporated to serve as a means for normally urging the valve stem out of the housing so that the cross-aperture or port 34 is spaced from the interior of the metering chamber. Also, an auxiliary or second biasing means in the form of a spring 52 has been incorporated to serve as a means for normally urging the auxiliary valve plunger toward the inlet orifice of the metering chamber. Since the separate springs serve different functions, they preferably have different coefficients of compressibility. The main or first spring 40 should be easily compressible to facilitate depression of the valve stem when it is desired to operate the assembly, and yet sufficiently stiff to maintain the upper surface of the valve stem base plunger in sealing engagement with the gasket 18. The auxiliary or second spring 52, however, preferably has a greater coefficient of compressibility since it serves to press the auxiliary plunger into tight seating engagement with the inlet orifice of the metering chamber.

The particular materials of which the springs are made, as well as the materials from which other components of the assembly are fabricated, will be governed to some extent by the active ingredients carried by the container. Various suitable materials have heretofore been adopted in fabricating components for use in aerosol assemblies, and such materials can be employed in fabricating the assembly provided by the present invention. For example, the valve stem and valve stem base plunger can be either plastic or metal, and the auxiliary plunger 50 can be formed of slightly resilient rubber, or formed of plastic or metal and can be provided with a resilient tip. Regardless of the material, however, preferably the tip portion 51 of the auxiliary plunger 50 is tapered so that it positively fits the inlet orifice 6, which is likewise tapered to receive the plunger. This is an important feature of the present invention since it provides for cooperative tight and proper seating between the auxiliary plunger tip and the inlet orifice.

It should be understood that the terms and expressions which have been employed herein are used as terms of description and not of limitation, and that there is no intention in the use of such terms and expressions of excluding various modifications within the scope of the invention which will become apparent after reading the foregoing description.

What is claimed is:

1. An aerosol metering valve assembly comprising a metering chamber having an inlet orifice and an aperture extending through a wall of said chamber opposite said inlet orifice and coaxial with said inlet orifice, a valve stem base plunger in said housing, said valve stem base plunger having a top face adapted to seat around said aperture, a stem coupled to and projecting upwardly of said valve stem base plunger, said valve stem being sealingly reciprocable in said aperture and having a longitudinal passageway therein, said stem also haveing at least one cross aperture therein spaced from said base plunger and communicating said passageway with the outside of said stem; first biasing means for normally urging said stem to a position where said cross-aperture is outside of said chamber and spaced from the inside of said chamber by a predetermined minimum distance and for normally urging said top face into seating engagement around said aperture; auxiliary plunger means adapted to close said inlet orifice, said auxiliary plunger means being supported from said valve stem base plunger in depending relation thereto for positive movement therewith, and second biasing means disposed above said inlet orifice cooperating between said auxiliary plunger means and said valve stem base plunger for normally urging said plunger means toward said inlet orifice, said auxiliary plunger means having a free end portion normally spaced from said inlet orifice by a distance less than said predetermined minimum distance whereby when said cross-aperture is in said position outside said chamber; said auxiliary plunger means being disposed out of closing relationship with said inlet orifice, said auxiliary plunger means being movable to close said inlet orifice through a distance less than said predetermined distance whereby upon initial movement of said stem in one direction to a position where said cross-aperture communicates said passageway with the interior of said chamber, said valve stem base plunger moves out of seating engagement around said aperture and said first biasing means is compressed, and with further movement of said stem in said one direction said auxiliary plunger means closes said inlet orifice before said cross-aperture communicates said interior of said chamber with said passageway, and as said stem is moved still further in said one direction to a position where said cross-aperture communicates said interior of said chamber with said passageway; said second biasing means is compressed to more tightly seat said auxiliary plunger means in engagement with said inlet orifice, and whereby after said stem has been moved in said one direction and released, said stem automatically moves in the opposite direction under the expanding action of said first and second biasing means such that said cross-aperture is out of communication with the interior of said chamber and all of the movable elements are automatically reciprocated to their normal positions.

2. A metering valve assembly as defined in claim 1 wherein said second biasing means comprises a coil spring; and wherein said auxiliary valve plunger is positively coupled to said valve stem base plunger for movement therewith solely by said second coil spring.

3. A metering valve assembly as defined in claim 2 wherein said first and second biasing means comprising first and second coil springs having longitudinal axes aligned with the longitudinal axis of said valve stem, and wherein said first coil spring is disposed in surrounding relation to said second coil spring within said chamber.

4. An aerosol metering valve assembly as defined in claim 1 wherein said valve stem base plunger has a recessed socket opening onto said top face, and wherein said stem is releasably received in said socket.

5. An aerosol metering valve assembly comprising a metering chamber having an inlet orifice and a first aperture extending through a wall of said chamber opposite said inlet orifice; gasket means adjacent said wall and having a second aperture therein coaxial with said first aperture; a valve stem base plunger in said housing adapted to seat around one of said apertures, said valve stem base plunger having a socket recess, and flange means partially closing said socket recess; a valve stem coupled to and projecting upwardly from said base plunger through said first and second apertures, said stem being provided with a continuously cylindrical peripheral portion having a sliding and sealing fit in at least said second aperture in said gasket means, said stem also having a longitudinal passageway therein and a cross-aperture therein spaced from said base plunger and communicating said passageway with the outside of said stem; first biasing means for normally urging said base plunger into seating engagement around one of said apertures and said valve stem to a normal position where said cross-aperture is spaced from the inside of said chamber by a predetermined minimum distance; an auxiliary valve plunger coupled to said main valve plunger for positive movement therewith and being adapted to close said inlet orifice, said auxiliary valve plunger comprising a shaft portion and a head portion, said head portion being reciprocally movable in said socket recess into and out of engagement with said flange means, said shaft portion of said auxiliary valve plunger having a free end spaced from said inlet orifice by a given distance less than said predetermined minimum distance, and second biasing means disposed in said socket recess above said head portion of said auxiliary valve plunger whereby said head portion is normally urged into engagement with said flange means and said shaft portion is normally urged toward said inlet orifice whereby as said stem is depressed to move said cross-aperture to a position in communication with the interior of said chamber, said first biasing means is compressed, said valve stem base plunger is unseated, then said auxiliary plunger closes said inlet orifice, and then said second biasing means is compressed prior to communication of said cross-aperture within the interior of said housing, and whereby when said stem is released all of the movable elements are automatically reciprocated to their normal positions under the action of said first and second biasing means.

6. A metering valve assembly as defined in claim 5 wherein said stem carries a lateral projection spaced above said wall, and wherein said first biasing means is disposed outside said chamber, between said projection and said wall.

7. An aerosol metering valve assembly comprising a metering chamber having an inlet orifice and a first aperture extending through a wall of said chamber opposite said inlet orifice and coaxial with said inlet orifice; gasket means underlying said wall within said chamber and having a second aperture therein coaxial with said first aperture; a valve stem base plunger in said housing underlying said gasket means and having its upper end adapted to seat on said gasket means around said second aperture; a valve stem coupled to and projecting upwardly from said valve stem base plunger through said first and second apertures, said stem being provided with a continuously cylindrical periphery having a sliding and sealing fit in at least said second aperture in said gasket means, said stem also having a longitudinal passageway therein and a cross-aperture therein spaced from said valve stem base plunger and communicating said passageway with the outside of said stem; first biasing means for normally urging said valve stem base plunger into seating engagement with said gasket means and said stem to a position where said cross-aperture is spaced from the inside of said chamber by a predetermined minimum distance; an auxiliary valve plunger supported from said valve stem base plunger in depending relation thereto for movement therewith, said auxiliary valve plunger having a tapered end adapted to seat on and close said inlet orifice, said tapered end of said auxiliary valve plunger normally being spaced from said inlet orifice by a given distance less than said predetermined minimum distance, and second biasing means normally urging said auxiliary valve plunger toward said inlet orifice whereby as said stem is depressed to move said cross-aperture to a position in communication with the interior of said chamber, said first biasing means is compressed, said base plunger means is unseated from said gasket means, then said auxiliary plunger closes said inlet orifice, and then said second biasing means is compressed to more tightly seat said auxiliary plunger prior to communication of said cross-aperture with the interior of said chamber, and whereby when said stem is released all of the movable element are automatically reciprocated to their normal positions under the action of said first and second biasing means.

8. An aerosol metering valve assembly as defined in claim 7 wherein said inlet orifice is correspondingly tapered to said tapered end of said auxiliary valve plunger.

References Cited in the file of this patent

UNITED STATES PATENTS

| | | |
|---|---|---|
| 1,626,939 | Kooperstein | May 3, 1927 |
| 1,699,364 | Kooperstein | Jan. 15, 1929 |
| 2,703,666 | Iannelli | Mar. 8, 1955 |
| 2,788,925 | Ward | Apr. 16, 1957 |
| 2,837,249 | Meshberg | June 3, 1958 |
| 3,018,928 | Meshberg | Jan. 30, 1962 |
| 3,055,560 | Meshberg | Sept. 25, 1962 |